Feb. 24, 1959         C. J. MARCH         2,874,985

DRILL CHUCK AND SPINDLE CONNECTION

Filed March 28, 1957

*INVENTOR.*
CLIFTON J. MARCH
BY *Golrick & Golrick*

ATTORNEYS

United States Patent Office 2,874,985
Patented Feb. 24, 1959

2,874,985

DRILL CHUCK AND SPINDLE CONNECTION

Clifton J. March, Phoenix, Md., assignor to The Black & Decker Manufacturing Company, Towson, Md., a corporation of Maryland Application March 28, 1957, Serial No. 649,039

2 Claims. (Cl. 287—53)

The present invention is concerned with the structure of a chuck and spindle connection for driving engagement therebetween, and more especially to a chuck and spindle connection particularly useful in portable electric hand drills.

For connecting the output spindle of electric hand drills to a tool-holding chuck various connections have been used, such as a male threaded spindle engaged in a corresponding female threaded bore in the chuck body, or at times the reversed threaded structure of a male threaded chuck shank engaged in a female spindle; or a force-fitted connection of a male tapered spindle in a female tapered bore of the chuck body.

The threaded connection has the disadvantages, for example, of requiring the production of two threaded elements; of being ill-adapted for driving in both rotational senses; and of difficulty in reassembly should the threads of either element become damaged. The force-fitted taper connection, although obviating such untoward features of the threaded type, begets its own problems. Thus the connection sooner or later either becomes loosened, or must be disassembled for servicing of the electric drill. In any of these cases, a workman is likely to hammer the chuck either to drive it back into force-fitted relation on the spindle or to remove it from the same. Damage to the chuck, the spindle or parts of the drill are then likely to occur as hereinafter described.

There is here contemplated the use of a tapered connection wherein a male tapered spindle is received into a female tapered bore in the chuck body or core, somewhat in the usual fashion of tapered connections, but without use of a force taper fit. A slot formation in the back end of the chuck, extending diametrically across the open end of the taper bore, receives a broad corresponding tongue formation integrally formed on the spindle at the termination of the inboard broad end of the spindle taper, whereby a strong rotational engagement is attained for driving the chuck in either direction. Further, there is provision of means for holding the chuck in proper axial position on the spindle, whereby the chuck is easily secured or released.

It is a primary object of the present invention to provide a drill chuck and spindle connection obviating as far as possible the disadvantages of such prior structures, while particularly avoiding the use of a force-fitted taper connection and its attendant possibility of tool damage by a workman ineptly attempting to loosen or tighten the chuck relative to the spindle.

Another object is to provide a connection for the stated use which is simple, rugged, relatively low in cost of manufacture and easily secured and released by common tools.

A still further object is the provision of a connection for the stated use which is adapted for transmission of relatively high torques indifferently in either sense of rotation.

Other objects and advantages will appear from the following description and the drawings wherein.

Figure 1:
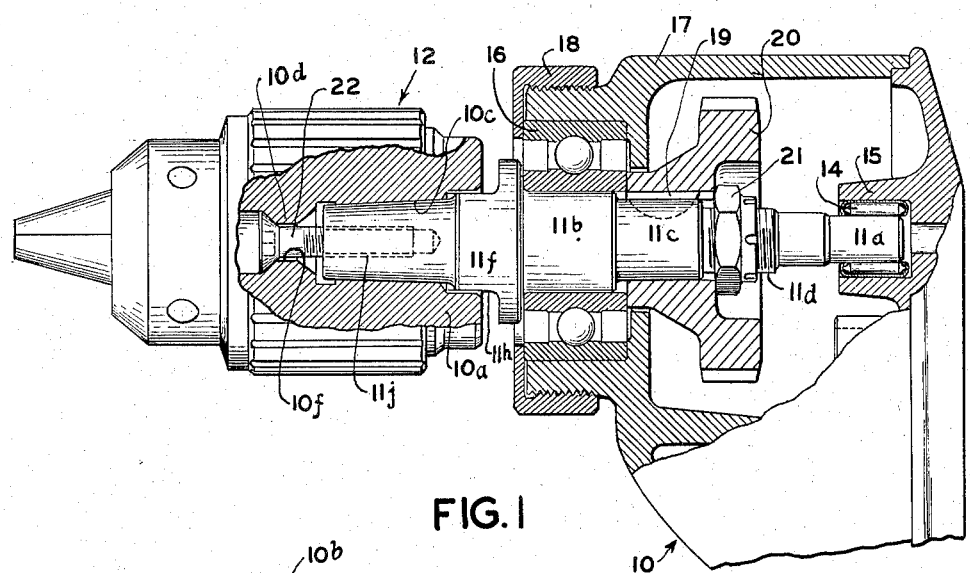
Fig. 1 is a fragmentary side view of an electric drill with certain portions broken away and other elements omitted to show a drill chuck and a spindle embodying the present invention.
Figure 2:
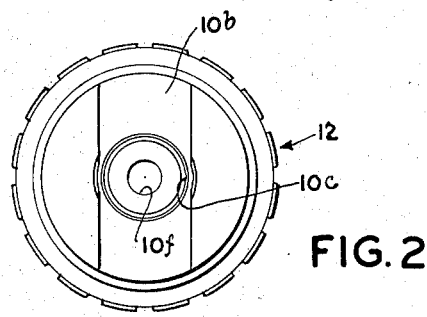
Fig. 2 shows the end of the chuck of Fig. 1 which receives the spindle.
Figures 3, 4:
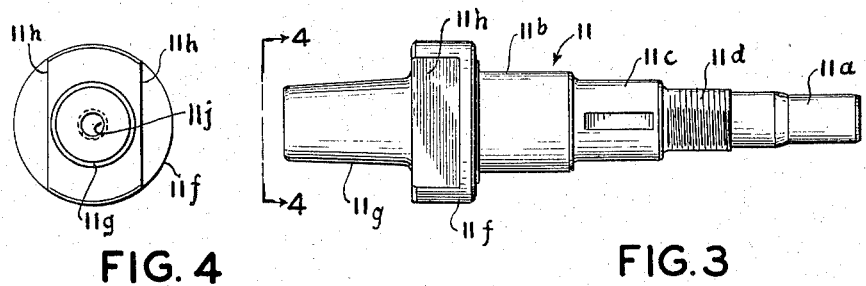
Fig. 3 shows a spindle element such as that appearing in Fig. 1.
Fig. 4 is an end view of the spindle taken as indicated by 4—4 of Fig. 3.

In the drawing there is shown in fragmentary fashion a portion of an electric drill such as portable hand drill 10 provided with a drive spindle 11 and chuck 12 of the present invention, representing a typical environment of use for which the invention has particular advantage although not restricted thereto.

The particular spindle here shown is journalled at its inner end of smallest diameter in a bearing 14 received in a suitable bearing socket formation in an end member 15 at the forward part of the drill case; and outwardly somewhat beyond mid-length at enlarged portion 11b, by a ball bearing unit 16 in a recessed nose of the reduction gearing housing 17 fitted and secured on the forward end of the drill casing proper. The bearing unit 16 is retained by the flanged cap member 18 threaded onto the externally threaded nose to engage endwise the outer race of the bearing unit. Inward of the formation 11b the spindle has successively reduced diameters at the key slotted portion 11c and threaded length 11d; and outward thereof a radial shoulder provided by enlargement 11f. An output driven gear element 20 supported on the spindle portion 11c is slotted for engagement by key 19. With nut 21 threaded onto the male threaded portion 11d to bear against the gear 20, the inner race of bearing 16 is clamped between the headed enlargement 11f and the gear, and hence the spindle is fixed axially in the drill. Since the remainder of the gearing system per se is no part of and is not so intimately affected by this invention, it is neither shown in the drawings nor here described.

The outboard end of the spindle comprises the previously mentioned shouldered or headed enlargement 11f having a pair of parallel flats 11h equally spaced from the axis of the spindle milled thereon, and a reduced tapered projection 11g with a coaxially threaded endwise bore 11j.

The chuck 12 in general construction is of conventional form insofar as the chucking jaws and other chuck elements are concerned. However, the core or body 10a of the chuck, which is usually fitted on the end of the spindle and secured thereto either by a threaded connection to the spindle end or by a driven fit of a taper spindle shank into a chuck body taper bore, is here secured on the taper in axial and rotational sense in a manner characteristic of this invention. Across the end of the chuck body there is milled a broad slot 10b running diametrically across the end of the taper bore 10c, the width thereof being sufficient to accommodate the tongue provided on the headed portion 11f of the spindle between the flats milled thereon. To provide a releasable securing means, an intermediate wall 10d of the chuck body is bored coaxially and counterbored at 10f to receive a hex socket flat head screw 22 threaded into the threaded bore 11j formed in the tapered end of the spindle whereby, with suitable end clearance provided between the bottom of the tapered bore and the spindle, the chuck is securely drawn onto the spindle taper and is retained in position with the spindle tongue formation engaged in the chuck end slot 11b. With larger chucks a slotted screw might be used where the chuck can admit a screw driver.

With the chuck jaws open, the screw may be engaged by an Allen wrench or the like conveniently inserted through the drill receiving space of the chuck to remove the screw from or run it into the spindle bore in removing or attaching the chuck.

Although the taper connection pilots the chuck onto and assures its coaxial relation with the spindle and also gives extended supporting bearing surface between chuck and spindle, it does not serve for a forced-fitted or driving connection therebetween. The driving connection, rotational engagement, is obtained solely through the tongue-and-slot engagement and the chuck is retained on the spindle through the screw 22 in the described structure.

Thus the chuck cannot come off the spindle by loosening of a force taper fit after a more or less extended period of operation, and any loosening that may occur is cured simply by tightening the screw 22. Likewise in removing or attaching the chuck, screw 22 need be only unscrewed or run into place with a wrench as explained. At no time is it necessary to apply axial force to the chuck.

The decided advantage of such connection is quite evident in the tool environment here appearing. With the force-fitted taper connection of the prior art, should the chuck loosen on the spindle, a workman using the electric drill frequently will drive the chuck tight with a hammer or the like with possibility of damage to the chuck elements, to the bearings such as 14 or 16, to the drill casing elements or gearing and also to the spindle itself by bending the latter. So also an untrained person, in undertaking to service or repair the drill, might attempt to drive the chuck on or off the spindle by hammer blows with possibility of similar damage. All such danger is here obviated by a simple, sturdy, reliable chuck-spindle connection easily manipulated with common tools and giving a high torque capacity driving engagement for operation in either direction.

I claim:

1. For a rotational driving connection of a portable electric drill spindle to the body of a chuck with tool bit shank engaging jaws: a spindle having a tongue formation extending diametrically across the rotational axis thereof and a coaxial male tapered formation projecting and converging endwise from the tongue formation, a chuck having a body with a coaxial female tapered bore formation opening at one end of the body and a slot formation extending diametrically across the opening of said bore formation, said formations of the chuck body being respectively adapted to receive the spindle taper and tongue formations, and cooperating means for retaining the tapered portion of the spindle seated in the bore and the tongue and slot formations in driving engagement; said means comprising a threaded coaxial bore running endwise into the male tapered formation, a coaxially apertured wall formation in the chuck body between the female tapered bore thereof and the jaw carrying end of the chuck, and a headed retaining screw bearing on and extending through said wall into threaded engagement with said threaded bore whereby the spindle and chuck may be clamped together or released from each other by rotation of said screw, said screw being accessible for rotational engagement by a tool inserted axially into the chuck from the jaw end thereof.

2. The combination of claim 1, wherein said tongue formation is provided by an integral radially enlarged shouldered portion on the spindle inboard of the taper formation thereof, said enlarged portion having thereon a pair of like parallel flats substantially equi-spaced from and parallel to the spindle axis.

References Cited in the file of this patent
UNITED STATES PATENTS

| | | |
|---|---|---|
| 2,309,754 | Crzellitzer | Feb. 2, 1943 |
| 2,501,421 | Stephans | Mar. 21, 1950 |
| 2,583,264 | Herrmann | Jan. 22, 1952 |
| 2,684,249 | Woytych | July 20, 1954 |